June 25, 1963 J. ROIZEN 3,095,473

EDITING SYSTEM FOR ELECTRONIC RECORDINGS

Filed May 16, 1960 2 Sheets-Sheet 1

JOSEPH ROIZEN
INVENTOR.

BY Harvey J. Lowhurst

ATTORNEY

JOSEPH ROIZEN
INVENTOR.

BY Harvey J. Lamshurst

ATTORNEY

United States Patent Office
3,095,473
Patented June 25, 1963

3,095,473

EDITING SYSTEM FOR ELECTRONIC RECORDINGS

Joseph Roizen, Palo Alto, Calif., assignor to Ampex Corporation, Redwood City, Calif., a corporation of California Filed May 16, 1960, Ser. No. 29,318
6 Claims. (Cl. 178—6.6)

This invention relates to signal recording and reproducing systems and more particularly to a system for scanning and editing television program material recorded on magnetic tape.

The recording of variable information on magnetic tape is now well established, but the recording of television program material for later reproduction imposes an additional requirement on the use of this form of recording medium. In particular, television program material is customarily subjected to extensive editing before viewing. The editing process includes the scanning of a selected portion of the program material, and viewing the scanned portion on monitor screens a section of the recorded program. It may be desired to view a single frame or picture, or to revise a program by cutting, splicing and rearranging different portions of the tape. The editing of serially recorded information on magnetic tape is comparatively simple. Owing to bandwidth requirements in television recording, however, it has been found most satisfactory to employ lateral multiple trace recording of the single field on the magnetic tape as it is advanced. The scanning and editing of material recorded in a multiplicity of lateral traces requires that the scanning or reproducing head must not only move relative to the magnetic tape during scanning, but must also follow the plurality of transverse traces which are inclined with respect to the length of the tape owing to the movement of the tape during the recording process.

The splicing step of the editing process must insure that none of the synchronizing information which is customarily recorded serially along one edge of a magnetic tape be disturbed. Splicing can be accomplished successfully without disturbance of the syncronizing information if the splicing is done precisely between frames, where a frame constitutes the area of magnetic tape which constitutes a single complete picture.

For these reasons there is a current need for a magnetic tape scanning and editing system for transverse recorded program information which provides single frame presentation simply, efficiently and accurately to afford the splicing and editing of the magnetic tape.

A particularly satisfactory recording and reproducing system for magnetic tape is disclosed in the Patent 2,866,012 to C. P. Ginsburg et al., issued December 23, 1958. The system of the Ginsburg et al. patent employs a plurality of magnetic recording-reproducing heads mounted for rotation about an axis parallel to the direction of movement of magnetic tape. The magnetic heads sequentially traverse the magnetic tape and record, in a series of transverse tracks, the information constituting a single frame. Because the path of the recording gap in the magnetic recording head is arcuate, the apparatus includes means for cupping the magnetic tape to conform with the shape and position of the magnetic heads. The Ginsburg et al. system allows the recording and reproduction of program material thereon but has no provision for editing or the monitoring of a single frame.

It is therefore a general object of this invention to improve the editing and monitoring of magnetic tape having multiple transverse track recording thereon.

A more specific object of this invention is to effect the editing and monitoring of single frames of recorded program material on magnetic tape without movement of the tape during the monitoring process.

Still another object of this invention is to allow editing and monitoring of program material on a magnetic tape with a minimum of wear on the recorded tape.

These objects are all achieved in accordance with this invention, one specific embodiment of which comprises a magnetic tape transport mechanism including a support member for cupping the magnetic tape and a scanning drum carrying a plurality of magnetic recording-reproducing heads. The magnetic heads may be axially and circumferentially spaced about the drum so that each scans a different track on the tape, and so that together they scan all the tracks of a frame. The magnetic heads are all connected to form the sequential inputs to a monitor cathode ray tube oscilloscope for viewing the material recorded on the frame as scanned by the rotating drum.

In accordance with another aspect of this invention there may be employed a dual system including common means for controlling the movement of master and duplicate magnetic tapes. The magnetic heads of a drum assembly are connected to scan recorded program material on the duplicate tape, with the output of the magnetic heads being displayed on a viewing device. The master and duplicate tapes may be moved in synchronism, with the master tape being edited without being subject to wear.

Another feature of this invention relates to the connection of the magnetic heads for sequentially reading out information scanned by the heads and for introducing that information into a monitor screen for reproduction of the program material constituting a single frame.

These and other features of this invention may be more clearly understood from the following detailed description and by reference to the drawing, in which.

Figures 1, 2, 3:
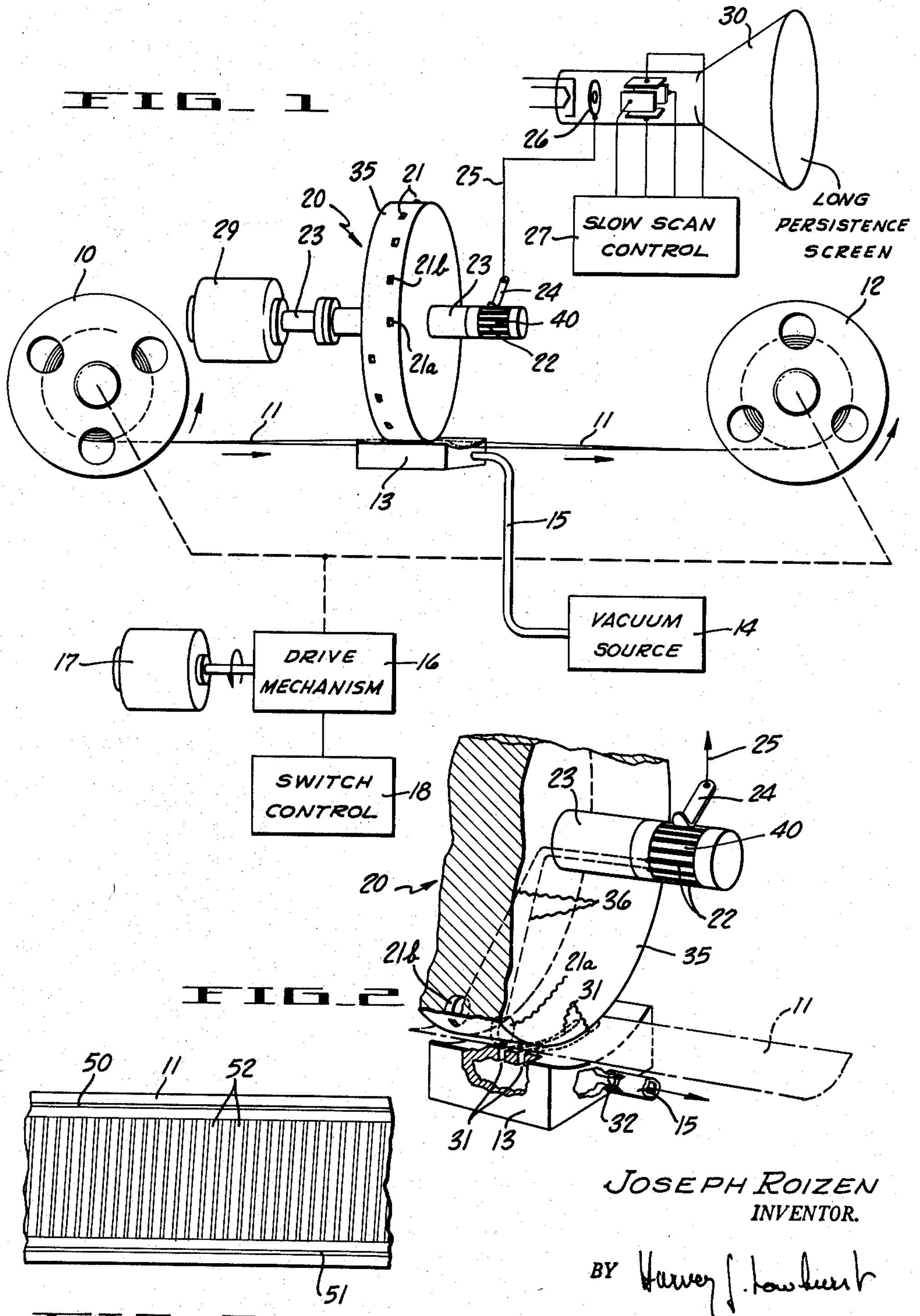
FIGURE 1 is a simplified mechanical schematic representation of apparatus in accordance with this invention.
FIGURE 2 is a sectional view of the reproducing drum and tape support mechanism of FIGURE 1, with portions broken away for clarity.
FIGURE 3 is a fragmentary section of a length of magnetic tape with the transverse recording tracks enlarged and increased in spacing for the sake of clarity.

In FIGURE 1, the apparatus of this invention includes a supply reel 10 carrying magnetic tape 11, a takeup reel 12 and a tape support member 13 therebetween. The magnetic tape 11 carries transverse recording tracks, as is described more fully below. The supply reel 10 and takeup reel 12 may be driven manually or by motors, not shown in the drawing, to allow the movement of tape to bring the section of tape to be monitored and edited into position above the tape support member 13. Tape guides and control elements have been omitted for simplicity. The member 13 may be more clearly seen in FIGURE 2 as including a hollow chamber which is partially evacuated by a vacuum source 14 through a pipe 15. The support member 13 is designed to cup the magnetic tape slightly in the region to be edited. The reels 10 and 12 may be driven by a drive motor 16 in the region to be edited.

Positioned above the member 13 is a drum 20 mounted for rotation about an axis nearly parallel with the direction of movement of the magnetic tape 11. The drum 20 mounts a plurality of, for example, sixteen, reproduce heads spaced at equal angles around its periphery and displaced laterally with respect to each other by the spacing between adjacent tracks on the magnetic tape. By "laterally" is meant an axial displacement along the axis of rotation of the drum 20. The referenced equal angles are such that the circumferential spacing between successive heads 21 is equal to the length of the magnetic tracks on the tape. The magnetic heads are all connected to individual commutator bars 22 on the shaft 23 of the drum 20. A single brush 24 is mounted to contact the commutator bars 22 in sequence as the drum 20 is rotated by a motor 29.

The output of the brush 24 is connected by a lead 25 to the grid of a monitor cathode ray tube 30 to allow the display of information scanned by the heads 21 in sequence. The monitor cathode ray tube 30 has a screen employing long persistence phosphors. Circuit couplings for the cathode and heater have been omitted for simplicity. The cathode ray tube 30 has a scanning speed control 27 to allow the display of the information read from the magnetic tape at a speed consistent with the speed of readout of the tape by the heads 21. The readout speed may be markedly slower than the speed at which the tape is normally intended to be reproduced. A slower readout speed results in some loss of definition and intensity but an adequate picture for editing purposes.

The particular relationship of the magnetic tape 11, the scanning drum 20 and the tape support member 13 may be more clearly seen in FIGURE 2. The tape support member 13 actually constitutes a hollow enclosure which has a plurality of slots 31 in the upper concave face thereof. The slots 31 communicate with the interior of the member 13 which in turn connects with an exhaust opening 32 connected to pipe 15. The application of the slight subatmospheric pressure within the chamber of member 13 draws the magnetic tape 11 against the concave upper surface of the member 13.

The drum 20, only a fragment of which appears in FIGURE 2, is mounted on a tubular shaft 23 for rotation with the peripheral surface 35 in spaced juxtaposition with the concave surface of the member 13. Mounted in the peripheral surface 35 are a plurality of reproducing heads 21, two of which, 21*a* and 21*b*, appear in FIGURE 2. The reproducing heads extend beyond the surface 35 of the drum 20 and into contact with the oxide particle surface of the magnetic tape 11. Conductors 36 from respective magnetic heads 21 extend from the heads 21 up through the interior of the drum 20 through the tubular shaft 23 and to individual commutator bars 22 mounted in the shaft 23 separated by insulating spacers 40.

The magnetic reproduce heads are positioned to traverse the magnetic tape 11 with the air gap in the magnetic heads 21 embracing the transverse tracks of the magnetic tape. The head 21*a* is an outermost head while the head 21*b* is positioned with its air gap adjacent to the next track of the magnetic tape. The remaining heads do not appear in FIGURE 2 but are displaced from heads 21*a* and 21*b* axially within the drum periphery and each is positioned over a different one of the tracks. The additional heads all have conductors which similarly extend through the opening 38 in the shaft 23 and are connected to respective commutator bars 22.

The drum 20 in a typical embodiment has a diameter in the order of nine inches for operation with a magnetic recording tape 11 of approximtaely two inches in width. The size of the drum 20 allows the positioning of the reproduce heads at the small incremental distances between the adjacent tracks on the magnetic tape while allowing the heads to be circumferentially displaced around the periphery by sufficient distances to avoid positional interference with each other. This is particularly significant when it is considered that the typical track separation is $\frac{1}{16}''$ or less, while the scanning heads themselves may be many times larger.

The nature of the tracks scanned may be seen in exaggerated form in FIGURE 3, showing a fragment of the magnetic tape 11. Adjacent to one edge of the magnetic tape 11 is a longitudinal track 50 carrying audio program material while intermittent recorded material on the opposite edge in a track 51 conveys synchronizing information. Between the two edge tracks 50 and 51 are the transverse tracks 52 carrying, in a typical application, video information. For clarity the various tracks 50, 51, 52 are visually defined on the tape 11 even though they are normally not visible. In a specific application sixteen adjacent tracks on the magnetic tape carry the complete information for one frame of a video display. As is described above, the plurality of tracks 52 are necessitated in order to achieve the head to tape speeds necessary to supply the bandwidth of the video signal. It should be noted that the tracks 52 are not at a right angle with respect to the edge of the magnetic tape 11 because the video information was recorded during the advance of the magnetic tape 11, thereby resulting in the inclination of the tracks relative to the tape. In order to scan the material on the inclined tracks, it is necessary that the drum 20 be mounted with its axis at a slight angle with respect to the length of the tape 11. The axis is inclined to the tape path at the same angle as the tracks 52 make with a transverse line on the tape 11. In order for proper registration between the magnetic heads 21 and the section of tape 11 the concavity of the member 13 should be right circular about the same axis as the drum 20 in contrast to apparatus of the Ginsburg et al. patent in which recording is done by the multiple heads on a drum positioned at right angles to the direction of movement of the magnetic tape.

For purposes of cutting and splicing the magnetic tape, the lateral faces of the drum 20 constitutes reference planes for cutting. The distance between the edge of the drum and the magnetic air gap in the outermost head 21*a* is fixed. Therefore, when a section of magnetic tape beneath the scanning drum provides a complete picture, it is apparent that the initial head 21*a* is registering with the first track of the frame. When this condition is achieved by the movement of the tape, as by operation of the switch control 18 to drive the reels 10 and 12, to the position at which the tape 11 permits reproduction of a completed frame, the reference for editing is determined. Once the reference has been established, the cutting and splicing of the tape may be accomplished employing standard splicing techniques as is well known in the art.

One complete frame or picture is displayed upon one complete revolution of the drum 20. However, in order to monitor the picture over any period of time, continuous rotation of the drum 20 is often desirable, particularly when the tape 11 must be moved to establish the reference for cutting and splicing. The repeated scanning of a small section of the tape for this purpose may cause excessive wear resulting in a degraded quality of video signals from the particular region. In order to avoid the problem of excessive wear a dual or duplicate system for monitoring of tape may be employed. Such a system is disclosed in FIGURE 4.

Figure 4:
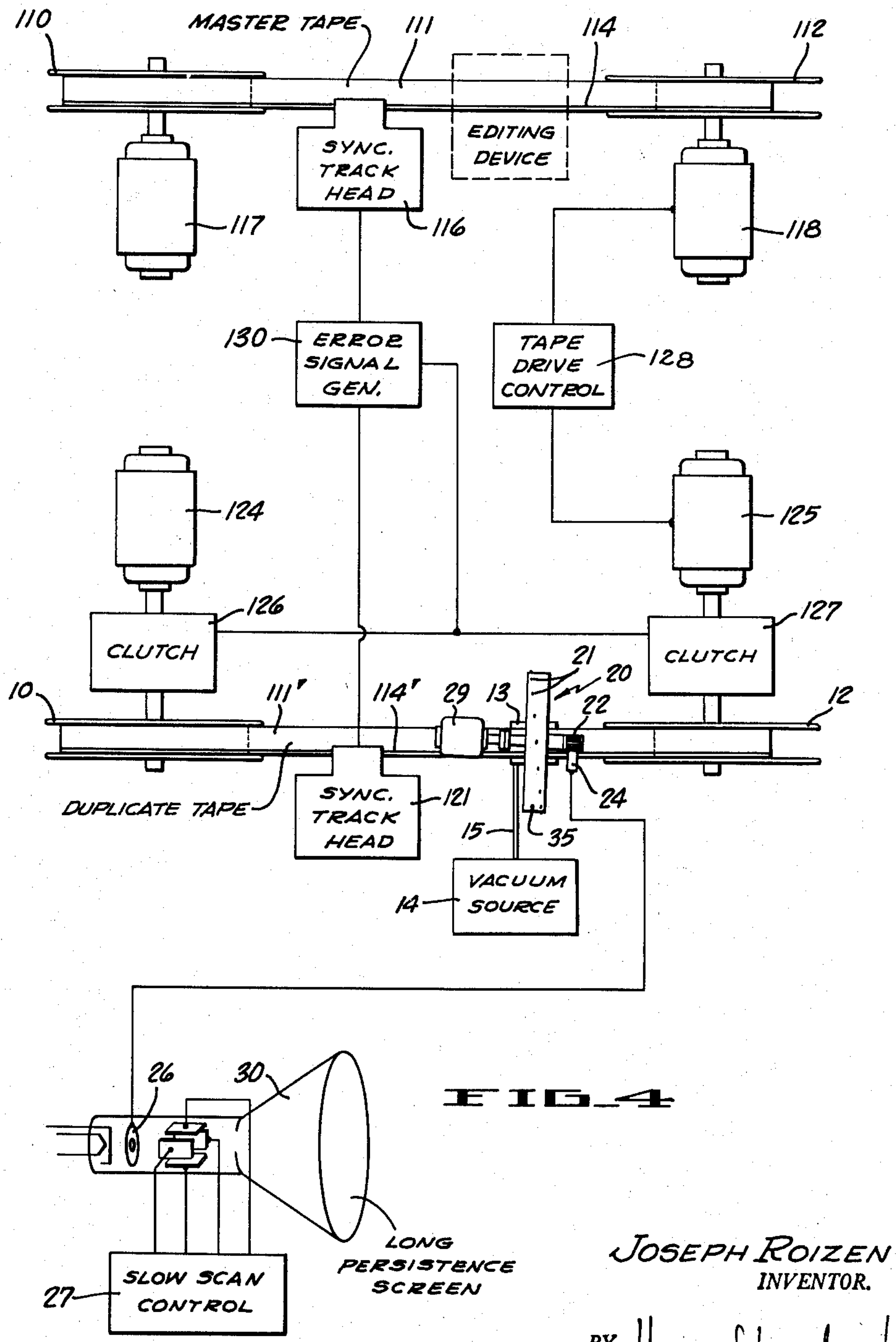
FIGURE 4 is a simplified mechanical schematic showing of the duplicate monitor arrangement in accordance with this invention.

Referring to FIGURE 4, there is shown in plan view a system which includes a tape transport mechanism including a supply reel 110 carrying a master magnetic tape 111 to a takeup reel 112 past an editing position at which an editing device (indicated only generally) may be positioned. The master magnetic tape 111 is provided with a control or synchronizing track 114 along one edge, and signals are generated from this track 114 by a sync track head 116. The guide elements for the tape 111 have not been shown, in order to simplify the drawing. Separate motors 117, 118 governed by a tape drive control 119, may rotate the reels 110, 112, respectively, to advance the tape 111.

The above described master tape arrangement may be employed in conjunction with a tape editing system, as described above with respect to FIGURE 1. The editing system shown is numbered to correspond to the arrangement of FIGURE 1. The tape 111' employed, however, is a duplicate of the master tape 111. In addition, a sync track head 121 is positioned to reproduce signals recorded on the control track 122. The reels 10 and 12 are driven, in this arrangement, by separate motors 124 and 125, respectively, which are generally matched to the motors 110, 112 of the master tape 111 system. The reel drives are effected through clutches 126, 127 which may be magnetic powered (hysteresis, or other types which may be controlled electrically so as to disengage the drives to a controlled extent.

If the motors 117, 118, 124 and 125 and the associated systems were prefectly matched in all respects, the master and duplicate tapes 111 and 111' could be driven in precise parallel relation from a common tape drive control 128 without added equipment. The display derived at the cathode ray tube 30 from reading the duplicate tape 111' would then permit the master tape to be marked and edited as desired. Numerous factors could operate to upset this balance, however, and to maintain a precise relationship between the master tape 111 and the duplicate tape 111' at the editing position and signal reproducing position, respectively, the sync track heads 116 and 121 are coupled to an error signal generator 130. The error signal generator 130, a number of types of which are commonly used in servo systems, provides signals whose polarity and amplitude are determined by the lead-lag relationship of the two synchronizing signals. These error signals are used to operate the clutches 126 and 127 so as to hold the tapes 111, 111' in parallel. With the arrangement shown, the motors 124, 125 may be arranged to operate slightly more rapidly than the motor 117 and 118, so that the clutches 126 and 127 introduce varying amounts of slippage in response to the error signals. Other synchronizing systems, such as capstan drives, will also suggest themselves to those skilled in the art.

It will therefore be recognized that although the rotating drum 20 and heads 21 scan across the duplicate tape 111', the master tape 111 may be accurately and conveniently edited. Further, because of the nature of the editing process, the duplicate tape 111' need not be a high fidelity reproduction of the master.

While there has been described above various arrangements for editing magnetic tape containing substantially transverse recording tracks, it will be appreciated that the invention should be taken to include all modifications and variations falling within the scope of the appended claims.

What is claimed is:

1. Apparatus for monitoring information magnetically recorded along a plurality of successive tracks substantially transverse to the length of a magnetic tape comprising:
   - a drum;
   - a plurality of magnetic transducers mounted on and spaced around the circumference of the drum in lateral off-set relation with the circumferential spacing between successive transducers being equal to the length of the recorded tracks and with the lateral off-set between successive transducers being equal to the distance between center lines of successive recorded tracks;
   - means for rotating the drum to bring the transducers in sequence into scanning position with respective sequential tracks of a selected stationary portion of the tape;
   - means for displaying the information of the scanned tracks; and
   - means for selectively moving the tape longitudinally past the drum between stationary scanning positions.

2. The combination of claim 1, wherein the recorded information is a composite television signal with a complete frame recorded along a predetermined number of tracks, further characterized in that the plurality of transducers corresponds in number to the predetermined number of tracks of a complete frame.

3. The combination of claim 1 further characterized in that the means for displaying the information is a cathode ray tube and includes control means for adapting the cathode ray tube to correspond to the scanning rate of the drum.

4. Apparatus for monitoring video information magnetically recorded along a plurality of successive tracks substantially transverse to the length of a magnetic tape comprising:
   - a master tape having video information recorded thereon;
   - a duplicate tape having the same video information recorded thereon;
   - means for moving the master tape in the direction of its length;
   - means for moving the duplicate tape in synchronism with the movement of the master tape;
   - a drum having a plurality of magnetic transducers mounted and spaced around the circumference of the drum in lateral off-set relation with the circumferential spacing between successive transducers being equal to the length of the recorded tracks and with the lateral off-set between successive heads being equal to the distance between center lines of successive recorded tracks;
   - means for rotating the drum to bring the transducers in sequence into scanning position with respective sequential tracks of a selected stationary portion of the duplicate tape;
   - means for displaying the information of the scanned tracks; and
   - editing means disposed in editing relation with the master tape at a position corresponding to the position of the drum in relation to the duplicate tape.

5. The combination of claim 4 wherein both the master tape and duplicate tape include magnetic tracks having control signals recorded thereon and the means for moving the duplicate tape in synchronism with the master tape is further characterized in that magnetic transducers reproduce the control signals of both tapes and means compare the reproduced control signals to provide a synchronizing signal for controlling movement of the duplicate tape.

6. The combination of claim 2 further characterized in that the means for selectively moving the tape longitudinally includes switching control means for positioning the tape with respect to the drum to scan a complete frame during one revolution of the drum.

References Cited in the file of this patent

UNITED STATES PATENTS

| | | |
|---|---|---|
| 1,972,444 | Hough | Sept. 4, 1934 |
| 2,022,505 | Hartley | Nov. 26, 1935 |
| 2,528,699 | Masterson | Nov. 7, 1950 |
| 2,697,754 | Ranger | Dec. 21, 1954 |
| 2,866,012 | Ginsburg et al. | Dec. 23, 1958 |
| 2,912,493 | Crooks et al. | Nov. 10, 1959 |
| 3,030,441 | Nemeth | Apr. 17, 1962 |

FOREIGN PATENTS

| | | |
|---|---|---|
| 807,594 | Great Britain | Jan. 21, 1959 |
| 1,188,391 | France | Mar. 9, 1959 |